3,383,313
PRODUCTION AND USE OF HYDROXYALKYL ACID ESTERS OF FATTY ACID
John D. Hetchler, Cleveland, Ohio
(2657 Tonawanda Drive, Rocky River, Ohio 44116)
No Drawing. Filed Oct. 19, 1965, Ser. No. 498,128
3 Claims. (Cl. 252—39)

This invention relates to means for producing hydroxyalkyl acid esters of alkaline earth saponified saturated fats, and the use of such esters in the lubricating and baking fields.

More specifically, this invention relates to the preparation and use of lactated fatty glycerides and of stearic glycolic lactic esters of fatty alcohols.

One of the objects of the invention is to provide a special process for producing the said esters and glycerides under unique high temperature reacting conditions.

Another object of the invention is to produce chemical reaction condensates of triglycerides of saturated fatty acids with either lactic acid, glycolic acid, or a combination of lactic and glycolic acids.

Still another object is to produce a new type of saturated fatty acid derivative of glycerine and polymerized lactic acid, said saturated fatty acids having a carbon atom range of $C_6$ to $C_{24}$, preferably $C_{16}$ and $C_{18}$ fatty acids.

Still another object is to provide a novel procedure for the production of either monostearyl glyceryl polytrilactate, or the stearyl ester of said lactate.

Still another object of the invention is to create improved steel mill rolling oils by formulating such rolling oils with the above said type of lactyl esters.

Another object of the invention is to create wax products having unique properties, by reacting hydroxyalkyl acids with fatty alcohols.

In the past, lactylic acid esters of fatty acids have been prepared by reacting lactic acid or its polymers with a fatty acid chloride such as, for example, stearyl chloride. The chemical structure as well as the physical properties of this type of fatty acid ester of lactic acid are entirely different from the products of this invention.

It has been discovered, in accordance with this invention, that, contrary to prior technological expectations, it is possible to react a partially saponified alkaline earth soap of a saturated fat with lactic acid to produce a condensation product which consists of saturated fatty acid partially esterified with glycerol and condensed with an alkaline earth salt of lactic acid. Upon treatment with a mineral acid such as sulfuric or hydrochloric acid, the alkaline earth is removed from the carboxyl groups of the lactic acid polymer and the end result is a fatty acid derivative which can be considered to be a glycerol polylactate of the fatty acids in the saturated fat.

Upon further reacting the above said derivative with fatty acid, the latter becomes chemically attached to the hydrogen atom of the polymer lactic acid hydroxyl group, to form the corresponding fatty acid ester. Thus, in the case of stearic acid, the process used in this invention results in the production of either monostearyl glycerol polytrilactate; or in the production of monostearyl glycerol polytrilactate stearate.

It has been found that when the above said mixture of calcium soap and fatty acid monoglycerides is reacted with a reaction product of dry calcium hydroxide and substantially anhydrous lactic acid or lactylic acid polymers, a new and novel chemical reaction takes place whereby the calcium in the form of calcium soap reacts with the carboxyl groups of the lactic acid products to form the corresponding calcium salts. As a result of these interesting novel reactions under non-aqueous conditions, the monoglycerides of the fatty acid condense with the polylactic acid molecules to produce either a lactate ester or, with further reaction, a fatty acid ester of the fatty acid glycerol lactate.

The above reactions have been found to take place only at critical high temperature ranges. Thus, the initial calcium soap formation in non-aqueous media must be carried out at a temperature range of 230 to 270° C. A temperature below 230° C. will prevent the formation of any appreciable amounts of calcium soap in a practical time period.

An even more critical temperature factor exists when the above said calcium soap is reacted with the reaction product of lactic acid and calcium hydroxide or free lactic acid. It has been found that this esterification reaction can only take place at a minimum temperature of 210° C., and that the action proceeds efficiently at a temperature range of 225° C. to 235° C., the preferred temperature being 230° C. If the temperature, during this said reaction, drops below 210° C., an inoperable gummy mass results which is impossible to carry forward under practical operating conditions.

The desired finished reaction product is a light brown colored syrup-like product in the reaction kettle. When cooled, this product forms a hard brittle compound having a melting point of between 35 and 45° C., depending upon the kind of saturated fatty acids or fat mixtures which are used as the starting material.

The above types of lactate esters of saturated fatty acids have been found to be particularly useful in the field of steel rolling mill lubricants. The particular properties which make these lactate esters of saturated fatty acids desirable when used in rolling oils in steel mills are of a complex nature.

The products produced in accordance with the first six examples of this specification are of particular value when used in conjunction with rolling oils, particularly oils used in steel rolling. They are also valuable as additives for gear lubricants intended for automobile differential gear lubrication.

In steel rolling, rolling oils containing my fatty acid derivatives give greater reduction in the thickness or gauge of steel, without necessitating any increase in electric power for the steel rolling mill. With the use of these fatty acid derivatives, the rolling oils require less emulsifier to maintain a uniform dispersion of the oil in water. It has been found, that by the addition of the fatty acid derivatives described in Examples 1 thru 6 of this specification, it is possible to maintain increased mill speeds thereby increasing production capacity and thus decreasing production costs of the finished sheet steel.

In the general field of gear lubricants, these same fatty acid derivatives have sufficient surface activity to alter the frictional characteristics of the lubricants; thereby enabling the working or clutch surfaces to engage with a complete absence of chatter or distress. It is believed that these advantages are caused by the surface lubricant action of the fatty acid derivative products, particularly their excellent metal affinity on a steel surface. It has been found that this prevents the spinning of wheels or what is known as slip-stick in automobile differential gears.

In using gear lubricants for automobiles, a satisfactory proportion of the fatty acid derivatives of this invention for the gear lubricant is the range of 7 to 12 percent of the total lubricant, and preferably is 10 percent.

In the case of steel mill rolling oils, the addition of 3 to 10 percent of the fatty acid derivatives produced in accordance with Examples 1 thru 6 will bring about the desired lubrication improvement in the rolling mill. In most cases, the fatty acid derivatives of this invention will replace the oleic acid in steel mill rolling oil lubricants because of the superiority of these new fatty acid derivatives to oleic acid from the standpoint of their ability to improve the surface activity of the metal sheet.

Either stearic acid or, preferably a triglyceride of a saturated fatty acid, will produce superior surface active properties on sheet steel when reacted with hydroxyacetic acid as above described. An excellent rolling of lubricant is obtained when the above type of fatty acid derivative is blended with yellow grease, tallow, or white grease, in the proportion of one part by weight of fatty acid derivative to 9 to 50 parts by weight of fat. Such a lubricant may be further improved with a small percentage of an emulsifier.

For rolling most grades of steel to the most common degrees of thickness, a superior rolling lubricant is produced by adding 10 parts of the fatty acid derivative additive of this invention to 90 parts of choice white grease. Such a blend provides a rolling lubricant which does not lose its effectiveness when in operation for extended periods of time.

The quality of the rolling oil is further improved by the addition of minor amounts of the trioleate or tristearate of triethanolamine. Small amounts of polyglycol esters of saturated or unsaturated fatty acids may also be used as additives in conjunction with the fatty acid-lactic acid or fatty acid-glycolic acid condensation products produced in accordance with this invention. These additives are emulsifiers or wetting agents which are preferably used in the ratio of one part of additive to between 10 and 100 parts of the base fatty material such as tallow or grease.

The conditions or proportions described in the first six examples of this specification can be considerably varied without destroying the sought for technical functions of the finished product. For example, one may replace 50 percent or more of the lactic acid with glycolic acid and obtain a similar product. It is possible to add a small amount of water to the fat-alkali reaction mixture and then use pressure to complete the saponification of the fat with the alkali in an autoclave. The lactic acid or hydroxyacetic acid, both may be added after the saponification is complete, and the pressure reduced to atmospheric. Examples of other suitable hydroxyalkyl acids are citric acid, or tartaric acid.

The type of alkali can be varied and the hydroxides of any alkali or alkali earth may be used in place of calcium hydroxide.

An excellent lubricating grease can be prepared by using blends of alkali metal soaps of hydrogenated lard-lactic acid or hydroxyacetic acid. While any of the alkali metal soaps of the above derivatives will produce a lubricant, the preferred products are the lithium, calcium, or a combination of lithium and calcium soaps blended with mineral oil in the ratio of 0.2 to 20 parts of the alkali metal soap per 80 to 100 parts of either a petroleum oil, fatty oil, or a fatty oil ester.

Any type of fat may be used with this invention to produce either the alkali metal salt or the free lactic acid-fat reaction product. Thus, such oil or fat products as tallow, lard, fish oil, castor oil, rape seed oil, soybean oil, coconut oil, lard oil, sperm whale oil, whale oil, China wood oil or any fatty oil or fatty acid or combinations of fatty oils, fats, or fatty acids, or their metal soaps, may be used in my process to produce compositions whose properties are valuable for the kinds of uses above described.

If desired, the new fatty acid derivatives described in the above specifications by reacting fatty products with the lactic acid or hydroxyacetic acid can be further derivatized by further reaction to produce derivatives of either amines, ammonia, amides, nitriles, or fatty alcohols.

EXAMPLE 1

Compound A

Provide a 1,000 cc. flask with a mechanical agitator and a nitrogen atmosphere, add 154.5 grams of hydrogenated lard having an iodine value of 0.5 and a melting point of 62° C. Heat the lard to 150° C. and then slowly add 16.98 grams of calcium hydroxide, with agitation. Increase the temperature within the flask to 265° C., and hold at a temperature range of 260° to 270° C. for 2.5 hours.

Compound B

In another flask equipped with a nitrogen sparge, heat 125.1 grams of 88 percent lactic acid to 100° C., add 3.4 grams of dry calcium hydroxide and heat the mixture to 125° C. Maintain the temperature of the mixture at a temperature range of 125° C. to 140° C. for 30 minutes.

Cool Compound A to 230° C. and slowly add Compound B to Compound A at a rate whereby the temperature of the reaction mixture is maintained at 230° C.

When the mixing is completed, a reaction takes place whereby a calcium hydroxide hydrogenated lard-lactic acid derivative product is obtained which is a syrup-like light brown colored product. When cooled, this product is a hard brittle compound melting at 45° C.

EXAMPLE 2

Add an aqueous sulfuric acid solution to the calcium hydroxide hydrogenated lard-lactic acid product of Example 1 and boil for 30 minutes. This produces a clear fatty acid ester derivative which forms a top layer on the surface of the water-acid solution. Wash the fatty derivative until free of sulfates, centrifuge, and dry. The finished product has a melting point of 39.5° C., an acid value of 117, and a saponification value of 270.

EXAMPLE 3

Compound A

Equip a two-liter round bottom flask with a mechanical agitator and an inert atmosphere, such as nitrogen, add 378 grams of hydrogenated lard flakes, heat with agitation to 150° C. and add 49.2 grams of dry calcium hydroxide. Increase the temperature to 260° C., and then maintain a temperature of 240 to 250° C. for 4 hours.

Compound B

To a separate 1,000 cc. flask equipped with an inert nitrogen atmosphere, add 283.2 grams of 88 percent lactic acid, heat to 100° C., and add 10.0 grams of dry calcium hydroxide. Increase the temperature to between 110° and 125° C., and hold at this temperature for one hour.

Cool Compound A to 235° C., and add slowly Compound B. The resulting reaction product is a brown colored syrup which becomes hard and brittle on cooling.

Upon treating the above lactic acid, hydrogenated lard, calcium hydroxide derivative product with an aqueous solution of hydrochloric acid in a manner similar to that described in Example 1, a low melting point fatty acid derivative product was obtained after the derivative was separated from the aqueous medium, washed, and dried.

EXAMPLE 4

Add 380 grams of hydrogenated soya bean oil having iodine value of 0.7 and an acid value of 0.25 to a two-liter flask, heat to 150° C. with agitation in an inert nitrogen atmosphere. Add 59.5 grams of dry calcium hydroxide, increase the temperature of the mixture to 265° C. and hold at between 250 and 265° C. for 4 hours.

Lower the temperature of the mixture to 235° C. and slowly add 283 grams of 88 percent lactic acid, maintaining the temperature at between 210 and 235° C. After all the lactic acid has been added, maintain the resulting blend at 210 to 235° C. for 3 hours.

A brown syrup-like product results which is hard and brittle when cooled to room temperature. Upon treating this product with a hot aqueous hydrochloric acid solution, centrifuging the fatty acid derivative layer, and washing it free of acid, there resulted a fatty acid derivative product having a melting point of 39.5° C.

EXAMPLE 5

Add 412.0 grams of lard oil to a 2,000 cc. flask equipped with an agitator and inert nitrogen atmosphere, heat to 150° C., add 56.8 grams of calcium hydroxide, increase the temperature to 250° C., and hold the reaction mixture at a temperature range of 250 to 260° C. for 4 hours.

Cool to 215° C., slowly add 340 grams of 88 percent lactic acid with agitation, and maintain the temperature between 200 and 225° C. After the reaction commences, continue heating for 4 hours and then cool to 125° C. Pour into a warm solution of sulfuric acid.

A clear liquid fat-like fatty acid derivative product is produced which floats on the surface of the water layer. Centrifuge, wash free of sulfates, and dry.

EXAMPLE 6

Add 1820 grams of refined lard to a five-liter flask equipped with a nitrogen sparge and a mechanical agitator. Heat to 125° C. Add, with agitation, 245 grams of calcium hydroxide, and increase the temperature to 255° C. Maintain a temperature of 250 to 260° C., with agitation for 4 hours.

Cool to between 210 and 225° C., and add 1470 grams of 88 percent lactic acid. Continue heating for 2 hours at 225° C., then cool to 125° C., pour into a warm 30 percent solution of sulfuric acid containing sufficient acid to neutralize all of the lime and have some acid in excess. Centrifuge, wash and dry the resulting clear brown fatty acid.

It has been found that, under proper temperature reaction conditions, hydroxyalkyl acids can be reacted with a fatty alcohol or a fatty alcohol together with a fatty acid to produce wax-like products having unique properties. These wax products are soluble in most solvents, can be emulsified after dissolving in a solvent, and have melting points in excess of 250° F.

These ester waxes have been found to be insoluble in boiling water, are very tough, and very difficult to fracture when made into a solid block. When these waxes are melted and poured into a solid block, there is substantially no shrinkage. As a result, the usual shrinkage voids or cracks which are common with ordinary waxes is avoided.

It is possible to vary the melting point, solubility, and other characteristics of these synthetic wax products by varying the ratio of hydroxyalkyl acid, or the number of moles of glycolic acid per fatty alcohol. This can be varied from the ratio of one mole of glycolic acid to 10 moles of fatty alcohol; but a preferred product is obtained by using one mole of stearyl alcohol to three moles of glycolic acid, together with one mole of stearic acid. It is also possible to use a blend of glycolic acid and lactic acid in any ratio. Thus, from one mole to 10 moles of combined glycolic acid and lactic acid can be used per mole of a fatty alcohol which can vary from $C_{12}$ to $C_{24}$. In the latter category, one may also use 12 hydroxy stearic acid or ricinoleic acid to obtain desired wax characteristics.

The following examples illustrate processes for obtaining the above described wax products:

EXAMPLE 7.—WAX PRODUCT

To a 2,000 cc. flask equipped with a stirrer and an inert nitrogen atmosphere, add 137.5 grams of a fatty alcohol mixture consisting of 90 percent stearyl and 10 percent cetyl alcohol. Add 359.1 grams of 70 percent glycolic or hydroxyacetic acid solution. The stearyl alcohol weight is about 10 percent in excess of the required reaction ratio of one mole of fatty alcohol to three moles of glycolic acid.

Heat slowly until all of the water is evaporated. Increase the temperature to between 540 and 560° F. and react for two hours with agitation. Cool the two-liter reaction flask to 225° F. and add a 5 percent excess of one mole of stearic acid, namely 135 grams. Heat again to 560° F. and react at this temperature in the presence of a nitrogen atmosphere for two hours.

Cool the final reaction product to 300° F. and pour into a shallow pan. The cooled product has a melting point of 250° F., and an acid value of 69.8. The cooled product is a lightly tanned colored wax which is hard and tough.

EXAMPLE 8.—WAX PRODUCT

Add 137.5 grams of stearyl alcohol and 298.7 grams of an aqueous 63.5 percent glycolic acid solution to the two-liter reaction flask of Example 1. Heat slowly until the water is evaporated to prevent foaming. After the water removal, heat to 540° F. and maintain this temperature for two hours with constant agitation.

Cool the reaction batch in the flask to 300° F. and add 135 grams of stearic acid. Increase the temperature to 560° F. and hold for two hours. Cool to a 300° F. and pour into pans.

This produces a honey-colored hard wax at room temperature.

EXAMPLE 9.—WAX PRODUCT

Add 137.5 grams of stearyl alcohol, 179.5 grams of hydroxyacetic acid and 168.0 grams of 88 percent lactic acid to the two-liter reaction flask described in Example 1. Slowly increase the temperature to 250° C. and maintain this temperature at between 240 and 260° C. until the acid value is constant for one-half hour. Slowly add 140 grams of stearic acid and maintain the temperature at 150° C. After adding all of the stearic acid, increase the temperature to 230° C. and hold at a temperature range of 225 to 235° C. for five hours, or until the acid value does not change over a half hour period.

In the case of the products produced by the processes described in Examples 7, 8 and 9, the finished wax products are considered to be chemically stearic glycolic esters of stearyl alcohol. The fatty alcohols which can be used to produce the above wax-type product can have a fatty radical range of $C_{12}$ to $C_{22}$.

From a chemical constitution standpoint, the hydroxyalkyl acid esters of fatty acids produced in the procedures described in the first six examples of this specification are believed to be lactated fatty glycerides, or the calcium salts thereof. The fatty acid base which can be satisfactorily used in the case of the first six examples may have a range of $C_6$ to $C_{22}$ carbon atoms.

The fatty acid derivatives produced in accordance with this invention can be used as valuable additives in the production of bakery goods for improving the quality of baked products. When added as an additive for bakery goods in amounts ranging from as low as 0.1 percent based on flour weight to as high as 5 percent based on flour weight, my fatty acid derivatives act as a means for improving the quality of baked goods, particularly bread, due to the novel emulsifying action of these fatty acid derivatives.

Having now described the means by which the objects of this invention are obtained, I claim:

1. A member of the group consisting of lubricating oils, rolling oils, and greases; containing sufficient amounts of the polyglycolic acid diester of stearyl alcohol and stearic acid to improve lubrication.

2. A member of the group consisting of lubricating oils, rolling oils, and greases, containing a polylactic acid ester of a higher fatty acid glyceride in sufficient amounts to improve lubrication.

3. A member of the group consisting of lubricating oils, rolling oils and greases containing sufficient amounts of an alkali metal and alkaline earth metal salt of a polylactic acid ester of a higher fatty acid glyceride to improve lubrication.

References Cited

UNITED STATES PATENTS

| 2,238,882 | 4/1941 | Goodings et al. | 252—56 X |
| 2,370,299 | 2/1945 | Farrington | 252—56 X |
| 2,864,703 | 12/1958 | Schulman | 260—410.8 |

FOREIGN PATENTS 551,403   5/1932   Germany.

DANIEL E. WYMAN, *Primary Examiner.*

W. H. CANNON, *Assistant Examiner.*